United States Patent [19]
Taniguchi

[11] Patent Number: 5,031,210
[45] Date of Patent: Jul. 9, 1991

[54] TELEPHONE APPARATUS
[75] Inventor: Kenichi Taniguchi, Fukuoka, Japan
[73] Assignee: Matsushita Electric Industrial Co., Ltd., Osaka, Japan
[21] Appl. No.: 557,897
[22] Filed: Jul. 25, 1990
[30] Foreign Application Priority Data
  Jul. 27, 1989 [JP] Japan .................................. 1-195906
[51] Int. Cl.$^5$ ............................................ H04M 1/72
[52] U.S. Cl. .................................... 379/165; 379/160; 379/164; 379/167
[58] Field of Search ............... 379/165, 158, 159, 160, 379/164, 166, 205

[56] References Cited
U.S. PATENT DOCUMENTS
4,490,583 12/1984 Bednarz et al. ...................... 379/158
4,821,319 4/1989 Middleton et al. .................. 379/159

Primary Examiner—Stafford D. Schreyer
Attorney, Agent, or Firm—Panitch, Schwarze, Jacobs & Nadel

[57] ABSTRACT

A telephone with an inter communicating facility is disclosed. The telephone has: a condition storage unit for storing operation condition data; an operation process unit for, when the operation of a hold key is detected, making the condition storage means to store the operation condition data indicative that the telephone holds a telephone line; and a condition control unit for, when the condition storage unit stores the data indicative that the telephone line is held, making a holding unit to hold the telephone line. When the operation of an extension call key is detected, the operation process unit makes the operation condition data indicative that the telephone is calling another telephone connected through an extension line to be stored in the condition storage unit, and makes a command transmission unit to transmit an extension call signal through the extension line. When the operation of a hook switch is detected, the operation process unit makes data indicative of the transfer state to be stored in the condition storage unit, and makes the command transmission unit to transmit the transfer command through the extension line.

6 Claims, 4 Drawing Sheets

TELEPHONE APPARATUS

BACKGROUND OF THE INVENTION

1. Field of the Invention

This invention relates to a telephone apparatus, and more particularly to a telephone apparatus having an inter communication facility and connected to one or more telephone lines and also to one or more other telephone apparatus through one or more extension lines.

2. Description of the Prior Art

Generally, in a system in which a plurality of telephone apparatus (hereinafter, often referred to as merely "telephones") are connected to one or more telephone lines, the transfer of a line connected to one of the telephones to another of them is conducted in either of the following two ways.

When telephones are connected in parallel to a telephone line and an extension line as shown in FIG. 4, the operator presses a hold key to put the telephone line on hold, and informs the person who should receive the call by using the all call paging facility or by word of mouth, and then the person receiving the call takes the handset of his telephone (i.e., offhook) and presses the key corresponding to the line on hold to connect the telephone line to his telephone.

When a PBX 51 or a central control apparatus such as a key telephone 61 having the inter communication facility is provided (as shown in FIGS. 5 and 6), the operator presses a hold key of his telephone to put the telephone line on hold, and then presses one of extension call keys which corresponds to the telephone of the person who should receive the call. The person picks up the handset of his telephone, and then can talk on the transferred line.

In a system in which a central control apparatus is not provided, it is cumbersome to conduct the transfer operation. In order to facilitate the transfer operation, however, it is required to provide a central control apparatus such as a key telephone 61 which is rather expensive.

SUMMARY OF THE INVENTION

The telephone apparatus of this invention, which overcomes the above-discussed and numerous other disadvantages and deficiencies of the prior art and can be connected to at least one telephone line and also to at least one extension line, and comprises: line selection means for selectively closing or opening said connected telephone line and extension line; a key board having a plurality of keys including a hold key, and an extension call key; key operation detection means for detecting the operation of any of said keys; holding means for holding at least said telephone line; and ringing tone generating means for generating a ringing tone, said apparatus further comprises: condition control means for, when said key operation detection means detects the operation of said hold key, making said holding means to hold said telephone line; command transmission means for transmitting signals through said extension line; and command reception means for receiving signals through said extension line, when said key detection means detects the operation of said extension call key, said command transmission means transmitting an extension call signal through said extension line, when an extension call signal received by said command reception means includes data indicative of said apparatus, said condition control means making said ringing tone generating means to generate a ringing tone.

The telephone apparatus of this invention which can be connected to at least one telephone line and also to at least one extension line, and comprises: line selection means for selectively closing or opening said connected telephone line and extension line; a key board having a plurality of keys including a hold key, and an extension call key; key operation detection means for detecting the operation of any of said keys; a hook switch; hook detection means for detecting operation of said hook switch; holding means for holding at least said telephone line; and ringing tone generating means for generating a ringing tone, said apparatus further comprises: condition control means for, when said key operation detection means detects the operation of said hold key, making said holding means to hold said telephone line; command transmission means for transmitting signals through said extension line; and command reception means for receiving signals through said extension line, when said key detection means detects the operation of said extension call key, said command transmission means transmitting an extension call signal through said extension line, when an extension call signal received by said command reception means includes data indicative of said apparatus, said condition control means making said ringing tone generating means to generate a ringing tone, when said hook detection means detects the off operation of said hook switch, said condition control means making said line selection means to close said telephone line.

The telephone apparatus of the invention which can be connected to at least one telephone line and also to at least one extension line, and comprises: line selection means for selectively closing or opening said connected telephone line and extension line; a key board having a plurality of keys including a hold key, and an extension call key; key operation detection means for detecting the operation of any of said keys; a hook switch; hook detection means for detecting operation of said hook switch; holding means for holding at least said telephone line; and ringing tone generating means for generating a ringing tone, said apparatus further comprises: condition storage means for storing at least one operation condition data; operation process means for, when said key operation detection means detects the operation of said hold key, making said condition storage means to store the operation condition data indicative that said apparatus holds said telephone line; condition control means for, when said condition storage means stores the data indicative that said telephone line is under the holding condition, making said holding means to hold said telephone line; command transmission means for transmitting signals through said extension line; and command reception means for receiving signals through said extension line, when said key detection means detects the operation of said extension call key, said operation process means making the operation condition data indicative that said apparatus is calling another apparatus connected through said extension line to be stored in said condition storage means, and making said command transmission means to transmit an extension call signal through said extension line, and, when said hook detection means detects the operation of said hook switch, said operation process means making data indicative of the transfer state to be stored in said condition storage means, and making said command transmission means to transmit the transfer command through said extension line, said apparatus further comprises: reception process means for, when an extension call signal received by said command reception means includes data indicative of said apparatus, making data indicative that said apparatus is called to be stored in said condition storage means, and for making data indicative of the transfer state to be stored in said condition storage means, said condition control means making said ringing tone generating means to generate a ringing tone, when the contents of said condition storage means include the data indicative that said apparatus is called, said operation process means, making said condition storage means to store data indicative that said hook switch is off, when said hook detection means detects the off operation of said hook switch, said line selection means closing said connected telephone line, when the contents of said state memory means include the data indicative that said hook switch is off.

In the above configurations, said extension call signal may be a dial signal.

In a case that a plurality of telephones according to the invention are connected in parallel to a telephone line and an extension line and one (transferring telephone) of the telephones is now connected to the telephone line, when the operator of the transferring telephone presses the hold key, the key operation detection means detects the operation of the hold key, and the operation process means makes the condition storage means to store the telephone line holding condition. The condition control means refers to the condition storage means, and controls the holding means so as to hold the telephone line. Then, the operator presses one of the dial number keys which is allocated to one (transferred telephone) of the other telephones to which the call is to be transferred. The operation process means controls the command transmission means so that it outputs through the extension line the extension call command including the code indicative of the transferred telephone, and makes the condition storage means to store the extension line calling condition.

In the transferred telephone, the command reception means receives the extension call command. If the code included in the extension call command coincides with that of the transferred telephone, the condition storage means is controlled so as to store the extension called condition. The condition control means refers to the condition storage means, and controls the ringing tone generating means to generate a ringing tone.

When the handset of the transferring telephone is put to onhook in this state, the hook detection means detects this onhook, and the operation process means refers to the condition storage means. Since the condition storage means stores both the telephone line holding condition and the extension line calling condition (i.e., the transfer condition), the command transmission means outputs the transfer command through the extension line.

In the transferred telephone, the command reception means receives the transfer command, and the reception process means controls the condition storage means so that it is updated from the extension called condition to the telephone line transferring condition.

When the handset of the transferred telephone is put to offhook in this state, the hook detection means detects this offhook, and the operation process means refers to the condition storage means. Since the contents of the condition storage means are the telephone line transferring condition, the line selection means selects the telephone line, thereby completing the transfer.

Thus, the invention described herein makes possible the objectives of:

(1) providing a telephone apparatus which can perform the transfer operation in a system without a central control apparatus;

(2) providing a telephone apparatus which is easy to operate in the transfer operation; and (3) providing a telephone apparatus which has an inter communication facility and is not expensive.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
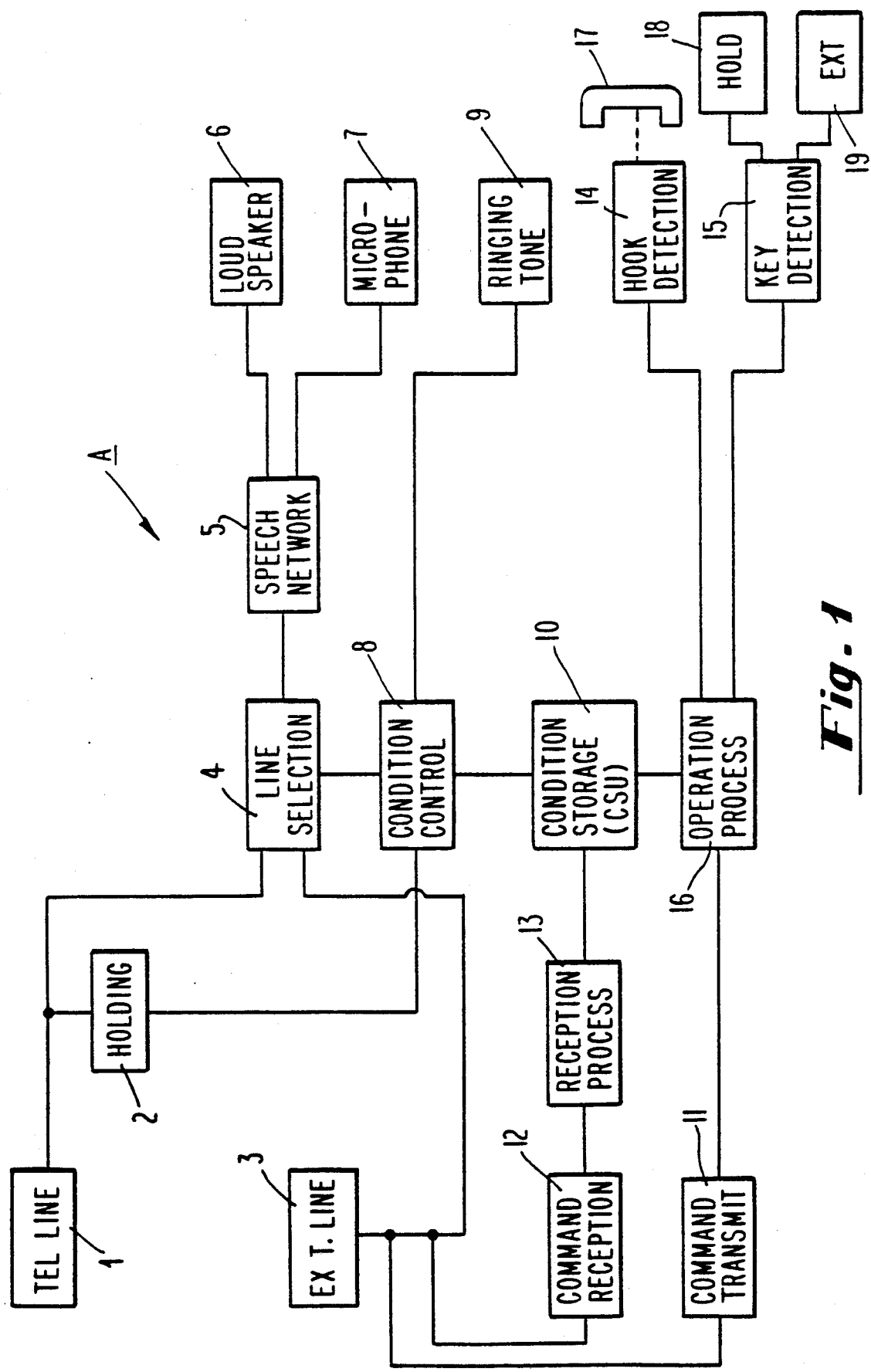
FIG. 1 is a block diagram of a telephone according to the invention.

FIG. 1 shows a telephone according to the invention. The telephone A of FIG. 1 has the inter communication facility, and is connected to a telephone line 1 and also to an extension line 3. The telephones A comprises: a holding unit 2 which holds the telephone line 1; a line selection unit 4 which selectively closes or opens the lines 1 and 3; a loudspeaker 6; a microphone 7; a speech network 5 which amplifies input signals, and sends signals input from the microphone 7 toward the lines 1 and 3; and a ringing tone unit 9 which generates a ringing tone.

The telephone A further comprises: a condition control unit 8 which controls the line selection unit 4, the holding unit 2, and the ringing tone unit 9; a condition storage unit 10 which can store several kinds of operation condition data; a command transmission unit 11 which transmits command signals to another telephone through the extension line 3; a command reception unit 12 which receives command signals from another telephone through the extension line 3; a reception process unit 13 which conducts various procedures in accordance with received commands; a hook detection unit 14 which detects the off and on operations of a handset 17; a key operation detection unit 15 which detects the operation of keys provided on a keyboard (not shown) and including a hold key 18 and an extension call key 19; and an operation process unit 16 which controls the condition storage unit 10 and the command transmission unit 11 in accordance with the outputs of the hook detection unit 14 and key operation detection unit 15. The operation condition data stored in the condition storage unit 10 includes those indicating that the telephone A is holding the telephone line 1 (telephone line holding), that the telephone A calls another telephone (extension line calling), that the telephone A is called through the extension line 1 (extension called); that the telephone line 1 is transferred to the telephone A (telephone line transferring), that the line selection unit 4 closes the telephone line 1 (telephone line closing), and that the line selection unit 4 opens the telephone line 1 (telephone line opening).

Figure 2A:
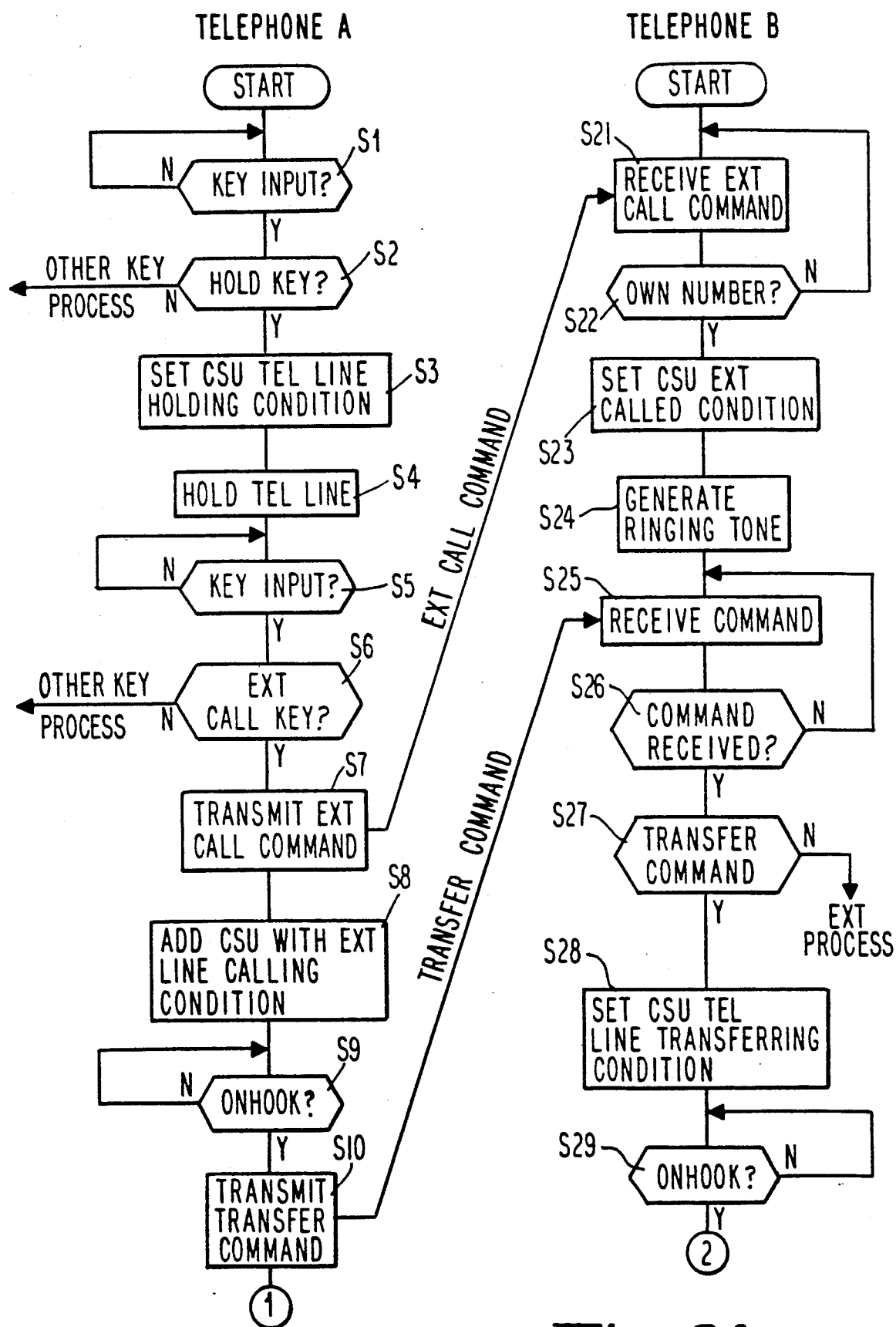
FIGS. 2A and 2B show a flowchart of the telephone of FIG. 1.
Figure 2B:
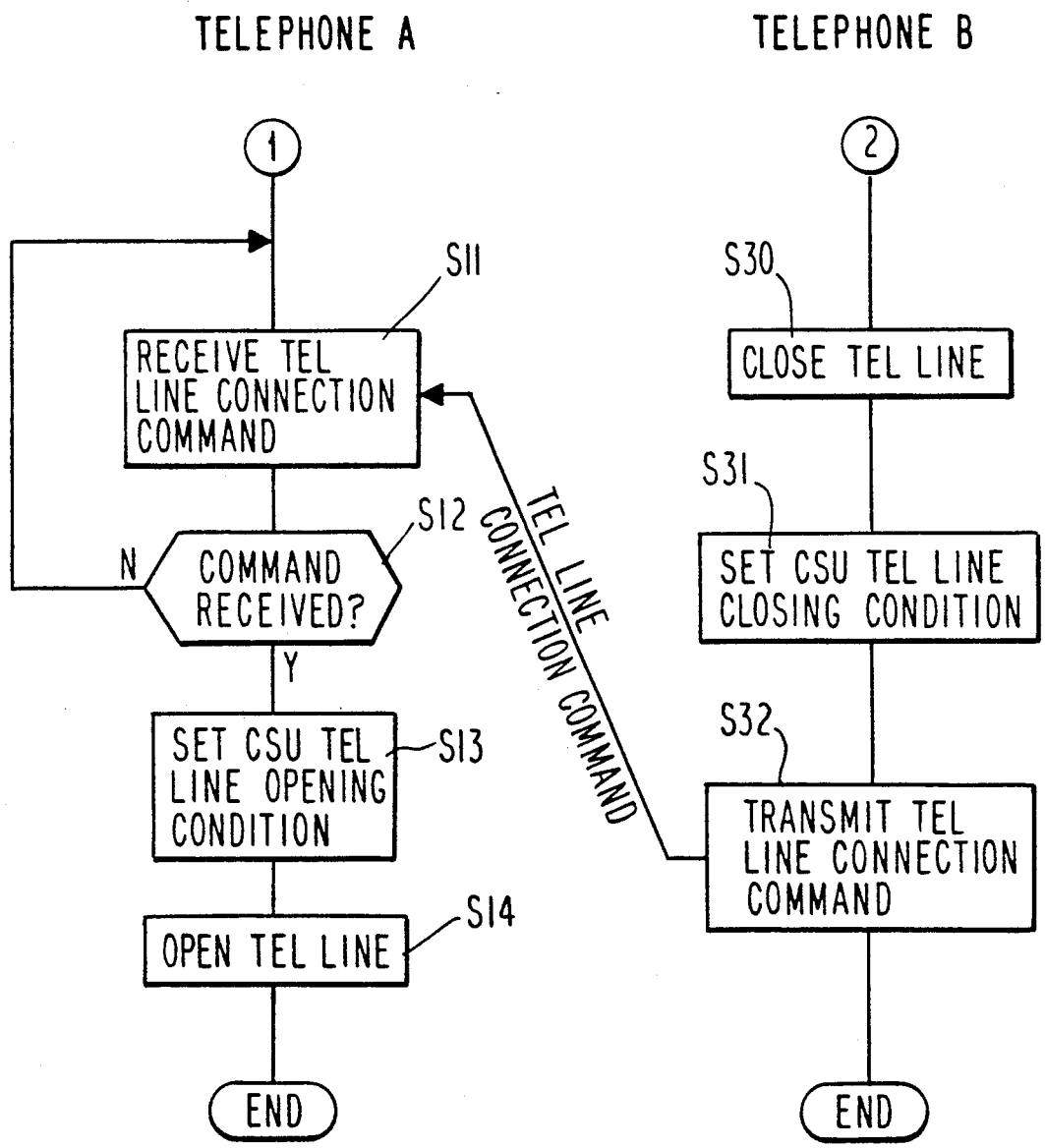
Figure 3:
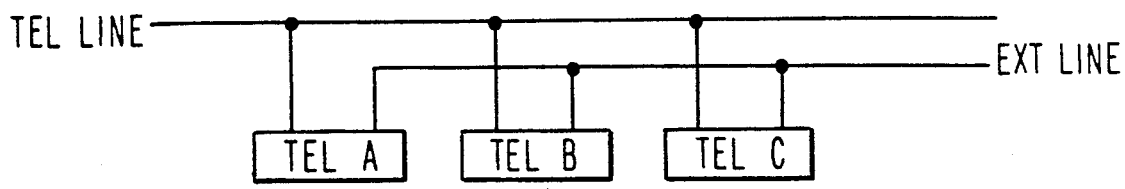
FIG. 3 is a diagram illustrating a manner of connecting telephones of FIG. 1.

The operation of the telephone A in the case that the telephone A and other telephones B and C having the same structure as that of the telephone A are connected in parallel to the lines 1 and 3 as shown in FIG. 3 will be described with reference to FIGS. 2A and 2B. In this case, the data transmission between the telephones A–C is performed by superposing 100-kHz signals upon the extension line 3 which are serially transmitted. That is, the presence of a 100-kHz signal indicates the digital data "1", and the absence of a 100-kHz signal indicates the digital data "0".

It is assumed that the telephone A has already been connected to the telephone line 1. In order to transfer the call, the operator depresses the hold key 18, the key operation detection unit 15 detects this, and the operation process unit 16 makes the condition storage unit 10 (in FIGS. 2A and 2B, abbreviated as "CSU") to store the telephone line holding condition (step S3). The condition control unit 8 refers to the condition storage unit 10, and controls the holding unit 2 so that the telephone line 1 is set to the hold condition (step S4). Thereafter, the operator presses the extension call key 19, and then presses one of the dial number keys (not shown) which is allocated to the telephone B. The operation process unit 16 receives the input from the key operation detection unit 15, and controls the command transmission unit 15 to output the extension call command through the extension line 3 (step S7). The extension call command may be a dial signal, or a signal including the code representing the telephone to which the call is transferred (i.e., the telephone B). The contents of the condition storage unit 10 are added with the extension line calling condition (step S8). In the telephone B which receives the extension call command in step S21, the condition storage unit 10 is controlled so as to store the extension called condition (step S23), and the ringing tone unit 9 generates a ringing tone (step S24).

When the operator of the telephone A sets the handset 17 onhook in this state, the output of the hook detection unit 14 causes the operation process unit 16 to refer to the condition storage unit 10. Since the contents of the condition storage unit 10 indicate both the telephone line holding condition and extension line calling condition (i.e., the telephone A is in the transfer operation), the command transmission unit 11 outputs the transfer command through the extension line 3 (step S10).

The telephone B receives the extension call command at the command reception unit 12 (step S21). If the received extension call command is a dial signal indicating the telephone B or includes the code representing the telephone B, then the contents of the condition memory unit 10 are set to the extension called condition (step S23). The condition control unit 8 refers to the condition storage unit 10, and causes the ringing tone unit 9 to generate a ringing tone (step S24).

When the command reception unit 12 of the telephone B receives the transfer command which is transmitted from the telephone A in step S10, the reception process unit 13 updates the contents of the condition storage unit 10 from the extension called condition to the telephone line transferring condition (steps S25 to S28). When the operator of the telephone B picks up the handset 17 and the hook detection unit 14 detects the offhook, the operation process unit 16 refers to the condition storage unit 10. Since the condition storage unit 10 stores the telephone line transferring condition, the condition control unit 8 refers to the condition storage unit 10, and controls the line selection unit 4 to connect the telephone line 1 (step S30). When the telephone line 1 is connected, the condition control unit 8 sets the condition storage unit 10 to the telephone line closing condition (step S31). The operation process unit 16 refers to the condition storage unit 10, and causes the command transmission unit 11 to transmit through the extension line 3 the code of the telephone B and the telephone line connection command indicative that the telephone line 1 is connected (step S32).

The telephone A receives the telephone line connection command in step S11 at the command reception unit 12. The reception process unit 13 makes the condition storage unit 10 to store the telephone line opening condition (step S13). The condition control unit 8 refers to the condition storage unit 10, and causes the telephone line holding unit 2 to disconnect the telephone line 1.

Figure 4:
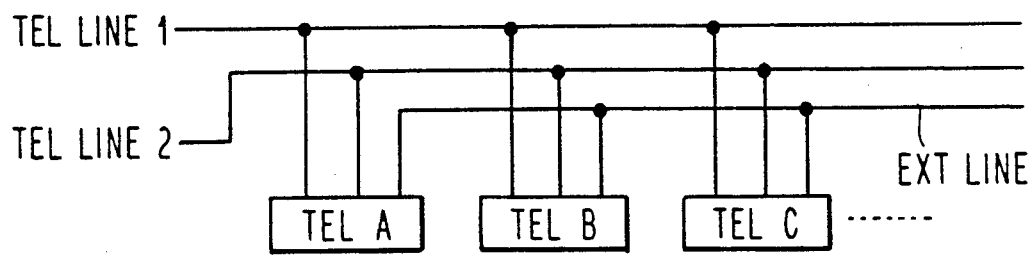
FIG. 4 is a diagram illustrating another example of connecting telephones of FIG. 1 in which the number of telephone lines is increased.
Figure 5:
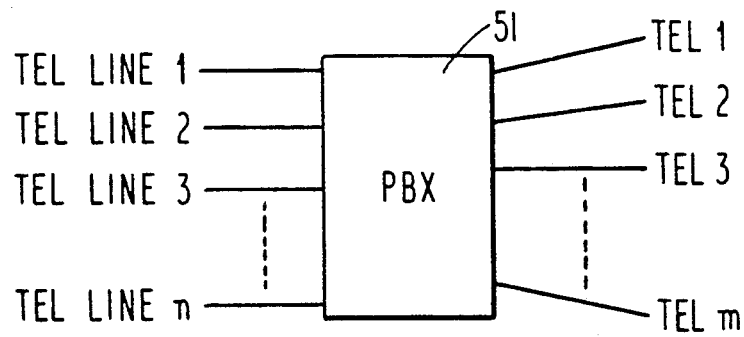
FIG. 5 is a diagram illustrating a manner of connecting prior art telephones using a PBX.
Figure 6:
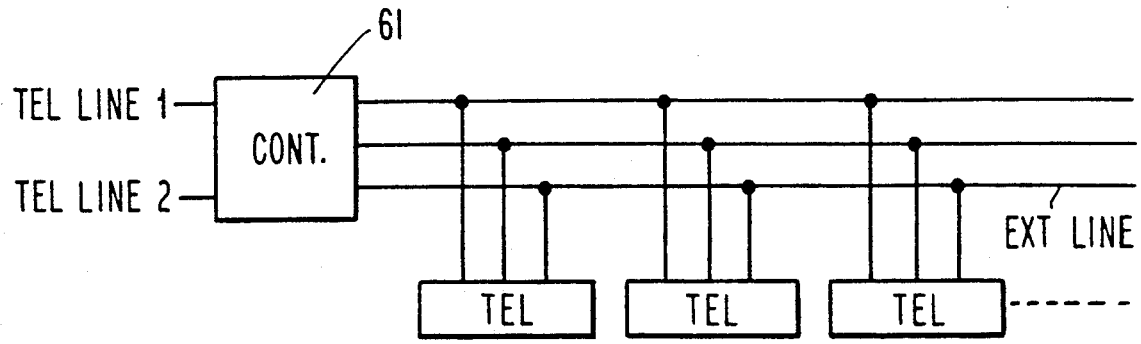
FIG. 6 is a diagram illustrating a manner of connecting prior art telephones using a key telephone.

When telephones A–C are connected to two or more telephone lines as shown in FIG. 4, each of the telephones is provided with a plurality of the telephone line hold units 2 the number of which is equal to that of the telephone lines. In this case, the transfer command may include a code which indicates the telephone line to be transferred so that the telephone B can distinguish the telephone line to which the telephone B should be connected.

According to the invention, the person transferring the call puts the call on hold and uses the inter communication facility to individually inform the person to whom he wishes to transfer the call, and then the person receiving the transferred call needs only to pick up the handset of the telephone in order to talk.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a telephone apparatus which can be connected to at least one telephone line and also to at least one extension line, and comprises: line selection means for selectively closing or opening said connected telephone line and extension line; a key board having a plurality of keys including a hold key, and an extension call key; key operation detection means for detecting the operation of any of said keys; holding means for holding at least said telephone line; and ringing tone generating means for generating a ringing tone, said apparatus further comprises:
condition control means for, when said key operation detection means detects the operation of said hold key, making said holding means to hold said telephone line;

command transmission means for transmitting signals through said extension line; and command reception means for receiving signals through said extension line, when said key detection means detects the operation of said extension call key, said command transmission means transmitting an extension call signal through said extension line, when an extension call signal received by said command reception means includes data indicative of said apparatus, said condition control means making said ringing tone generating means to generate a ringing tone.

2. A telephone apparatus according to claim 1, wherein said extension call signal is a dial signal.

3. In a telephone apparatus which can be connected to at least one telephone line and also to at least one extension line, and comprises: line selection means for selectively closing or opening said connected telephone line and extension line; a key board having a plurality of keys including a hold key, and an extension call key; key operation detection means for detecting the operation of any of said keys; a hook switch; hook detection means for detecting operation of said hook switch; holding means for holding at least said telephone line; and ringing tone generating means for generating a ringing tone, said apparatus further comprises:

condition control means for, when said key operation detection means detects the operation of said hold key, making said holding means to hold said telephone line;

command transmission means for transmitting signals through said extension line; and command reception means for receiving signals through said extension line, when said key detection means detects the operation of said extension call key, said command transmission means transmitting an extension call signal through said extension line, when an extension call signal received by said command reception means includes data indicative of said apparatus, said condition control means making said ringing tone generating means to generate a ringing tone, when said hook detection means detects the off operation of said hook switch, said condition control means making said line selection means to close said telephone line.

4. A telephone apparatus according to claim 3, wherein said extension call signal is a dial signal.

5. In a telephone apparatus which can be connected to at least one telephone line and also to at least one extension line, and comprises: line selection means for selectively closing or opening said connected telephone line and extension line; a key board having a plurality of keys including a hold key, and an extension call key; key operation detection means for detecting the operation of any of said keys; a hook switch; hook detection means for detecting operation of said hook switch; holding means for holding at least said telephone line; and ringing tone generating means for generating a ringing tone, said apparatus further comprises:

condition storage means for storing at least one operation condition data;

operation process means for, when said key operation detection means detects the operation of said hold key, making said condition storage means to store the operation condition data indicative that said apparatus holds said telephone line;

condition control means for, when said condition storage means stores the data indicative that said telephone line is under the holding condition, making said holding means to hold said telephone line;

command transmission means for transmitting signals through said extension line; and command reception means for receiving signals through said extension line, when said key detection means detects the operation of said extension call key, said operation process means making the operation condition data indicative that said apparatus is calling another apparatus connected through said extension line to be stored in said condition storage means, and making said command transmission means to transmit an extension call signal through said extension line, and, when said hook detection means detects the operation of said hook switch, said operation process means making data indicative of the transfer state to be stored in said condition storage means, and making said command transmission means to transmit the transfer command through said extension line, said apparatus further comprises:

reception process means for, when an extension call signal received by said command reception means includes data indicative of said apparatus, making data indicative that said apparatus is called to be stored in said condition storage means, and for making data indicative of the transfer state to be stored in said condition storage means, said condition control means making said ringing tone generating means to generate a ringing tone, when the contents of said condition storage means include the data indicative that said apparatus is called, said operation process means making said condition storage means to store data indicative that said hook switch is off, when said hook detection means detects the off operation of said hook switch, said line selection means closing said connected telephone line, when the contents of said state memory means include the data indicative that said hook switch is off.

6. A telephone apparatus according to claim 5, wherein said extension call signal is a dial signal.

* * * * *